US006209186B1

(12) United States Patent
Hui et al.

(10) Patent No.: US 6,209,186 B1
(45) Date of Patent: Apr. 3, 2001

(54) FIXTURE TO SET A DOOR STRIKER

(75) Inventors: Anna Hui, Rochester Hills; Michael J McGregor, Jr., West Bloomfield, both of MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/466,350

(22) Filed: Dec. 17, 1999

(51) Int. Cl.[7] .............................. B23Q 3/00; B23Q 3/06; B25B 27/14

(52) U.S. Cl. ............................ 29/468; 29/271; 29/281.5; 29/464; 29/407.1

(58) Field of Search .............................. 29/464, 468, 271, 29/281.1, 281.4, 281.5; 269/21, 16, 287, 37, 40, 905

(56) References Cited

U.S. PATENT DOCUMENTS

| | | | | |
|---|---|---|---|---|
| 4,744,135 | | 5/1988 | Roels . | |
| 4,930,337 | * | 6/1990 | Schaap . | |
| 4,989,313 | | 2/1991 | Dzurko et al. . | |
| 5,282,305 | | 2/1994 | Nutt et al. . | |
| 5,562,001 | * | 10/1996 | Bell . | |
| 5,653,012 | | 8/1997 | Pasternak et al. . | |
| 5,694,675 | | 12/1997 | Pasternak et al. . | |
| 5,979,952 | * | 11/1999 | Dering et al. .......................... | 29/468 |
| 6,029,335 | * | 2/2000 | Hui et al. ............................... | 29/464 |

* cited by examiner

*Primary Examiner*—S. Thomas Hughes
*Assistant Examiner*—Eric Compton
(74) *Attorney, Agent, or Firm*—Kenneth H. Maclean

(57) ABSTRACT

A tool for aligning a striker to a latch mechanism is provided. The tool includes a body locating portion and first and second locating portions. The body locating portion selectively couples the tool to a first structure, such as a vehicle body. The first location portion has a wedge member and a post member. The post member engages a latch ratchet in the latch mechanism and the tapered surfaces of the wedge member engage either the latch mechanism or the structure to which the latch mechanism is mounted. The second location portion includes a plate member, a positioning member and a positioning structure. The plate member has a first cavity which receives the positioning member. The plate member also has a slot which receives a member of the striker. The positioning structure is coupled to the plate member and slidable thereon along an axis parallel to the first cavity. The positioning structure adapted to contact a rear surface of the second structure. The positioning member disposed at least partially within the first cavity and coupled to the positioning structure such that axial movement of the positioning structure in a first axial direction causes positioning member to move an equal amount in an axial direction opposite the first axial direction. Contact between the positioning structure and the rear surface of the second structure causes the positioning member to move within the slot such that a tip of the positioning member defines a desired position of an outermost portion of the leg of the striker. A method for aligning a striker to a latch mechanism is also provided.

20 Claims, 11 Drawing Sheets

FIXTURE TO SET A DOOR STRIKER

BACKGROUND OF THE INVENTION

1. Technical Field

The present invention relates generally to vehicle assembly tooling and more particularly to a tool for aligning a door striker to a vehicle body.

2. Discussion

Despite widespread use of striker positioning fixtures, variations in the various components which affect striker alignment have not eliminated the need to manually verify and adjust the alignment of a striker structure to a latch mechanism. Many of the tools currently in use are based on nominal dimensions and lack the capability to accurately adjust for normal manufacturing and assembly tolerances. Consequently, vehicle manufactures expend tremendous amounts of labor to measure the alignment between the striker and a latch mechanism, and to adjust the alignment of the striker when it is determined to be out of position.

To gage the alignment between a striker and a latch mechanism, a technician will repeatedly open and close a vehicle door to "feel" whether the striker is dragging on the latch mechanism. This process is heavily dependent upon the skill and experience to the technician and several iterations of unfastening, moving, refastening and rechecking are typically necessary to obtain satisfactory alignment.

Despite the effort that vehicle manufactures expand to achieve proper alignment between a striker and a latch mechanism, complaints regarding improperly aligned strikers are relatively frequent. Consequently, there remains a need in the art for tool for aligning a striker to a latch mechanism that provides more accurate results.

SUMMARY OF THE INVENTION

It is one object of the present invention to provide a tool for coupling a striker to a structure in operative alignment with a latch mechanism.

It a more specific object of the present invention to provide a tool for aligning a striker to a latch mechanism which compensates for the variances in the manufacturing and assembly which affect striker alignment.

It is yet another object of the present invention to provide a method for aligning a striker to a latch mechanism.

A tool for coupling a striker to a first structure in operative alignment with a latch mechanism is provided. The tool includes a body locating portion and first and second locating portions. The body locating portion selectively couples the tool to a first structure, such as a vehicle body. The first location portion has a wedge member and a post member. The post member engages a latch ratchet in the latch mechanism and the tapered surfaces of the wedge member engage either the latch mechanism or the structure to which the latch mechanism is mounted. The second location portion includes a plate member, a positioning member and a positioning structure. The plate member has a first cavity which receives the positioning member. The plate member also has a slot which receives a leg member of the striker. The positioning structure is coupled to the plate member and slidable thereon along an axis parallel to the first cavity. The positioning structure adapted to contact a rear surface of the second structure. The positioning member disposed at least partially within the first cavity and coupled to the positioning structure such that axial movement of the positioning structure in a first axial direction causes positioning member to move an equal amount in an axial direction opposite the first axial direction. Contact between the positioning structure and the rear surface of the second structure causes the positioning member to move within the slot such that a tip of the positioning member defines a desired position of an outermost portion of the leg of the striker. A method for aligning a striker to a latch mechanism is also provided.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
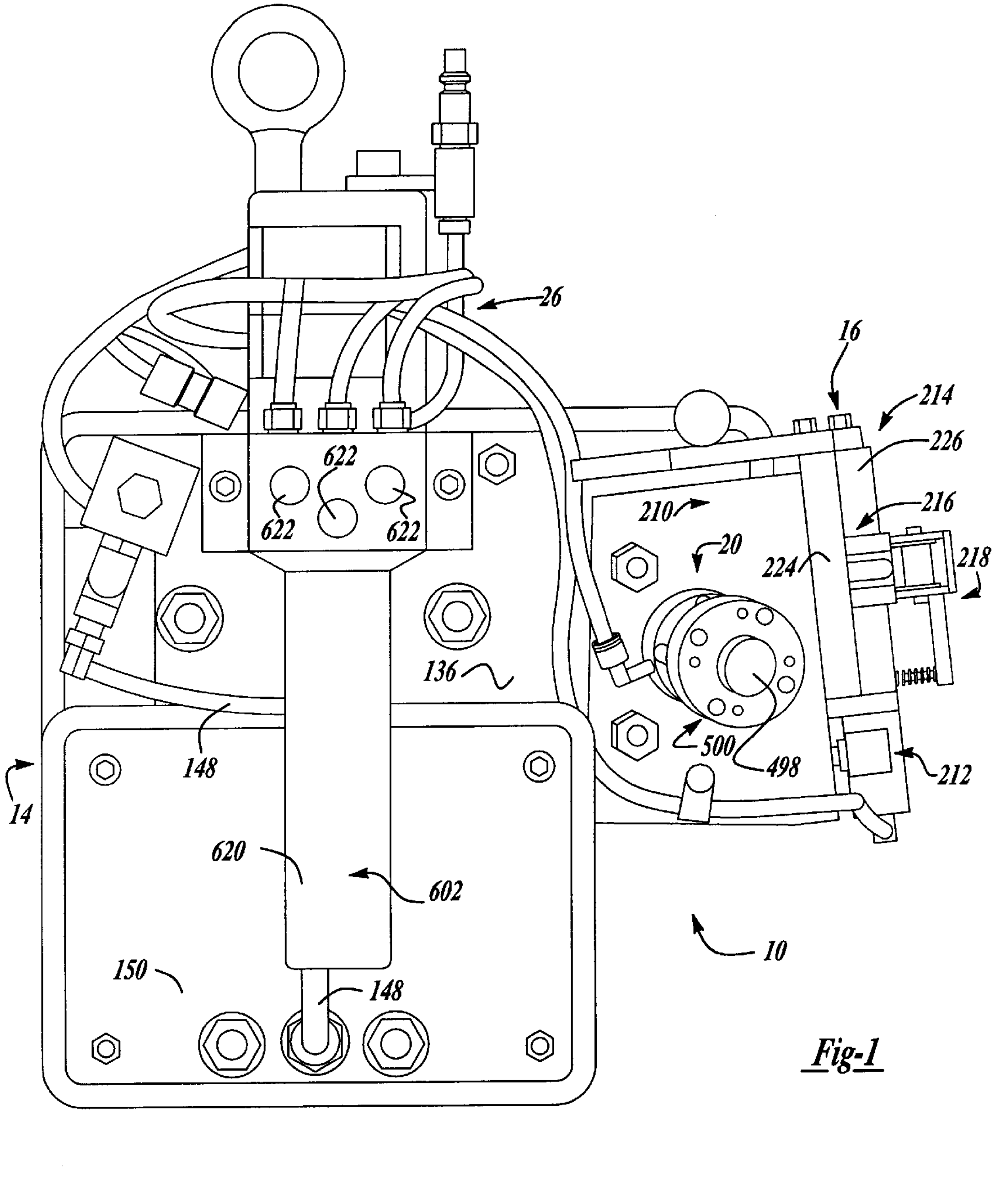
FIG. 1 is a rear view of a tool constructed in accordance with the teachings of the present invention.

With reference to FIG. 1 of the drawings, the assembly tool of the present invention is generally indicated by reference numeral 10. Tool 10 is shown to include a body locating portion 14, a fixturing portion 16, a seal load simulation portion 20 and a controls portion 26. Briefly, body locating portion 14 is operable for securing tool 10 to a vehicle body, fixturing portion 16 is opertable for locating a striker structure relative to a latch mechanism, seal load simulation portion 20 simulates the load which a seal exerts on the perimeter of a door assembly and controls portion 26 is operable for actuationg body locating portion 14, fixturing portion 16 and seal load simulation portion 20.

Figure 2:
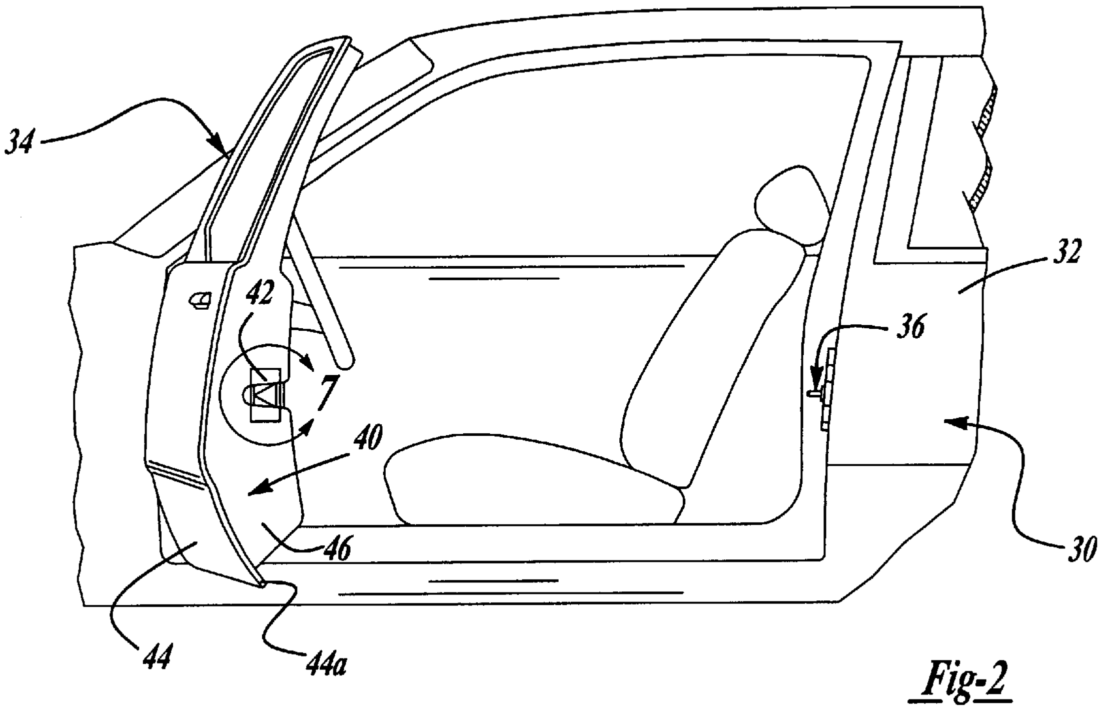
FIG. 2 is a side view of a vehicle.
Figure 3:
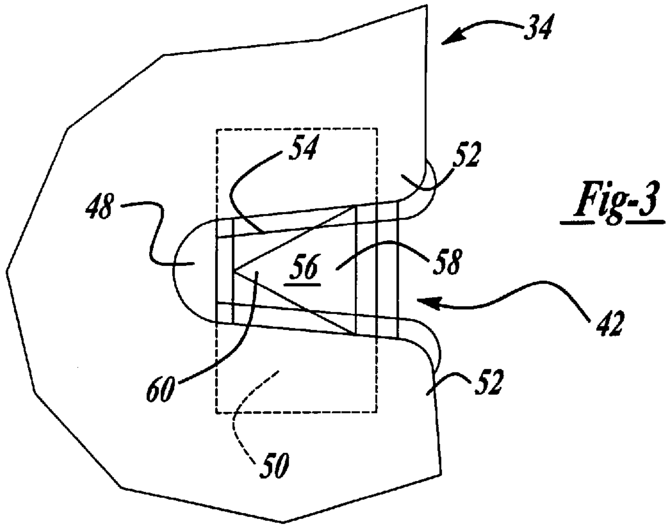
FIG. 3 is an enlarged view of a portion of the door shown in FIG. 2.
Figure 4:
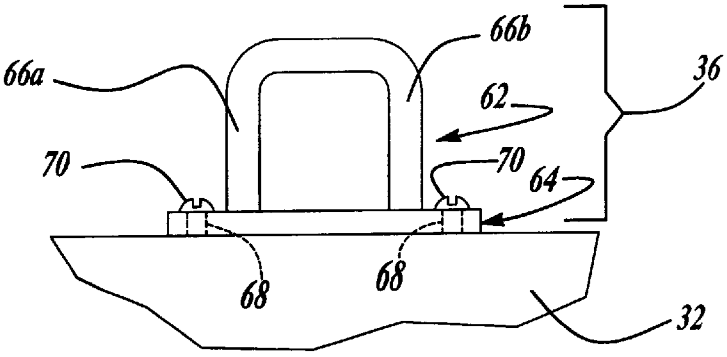
FIG. 4 is a top view of the striker shown in FIG. 2.

An exemplary vehicle 30 is illustrated in FIG. 2 through 4, and is shown to include a vehicle body 32, a vehicle door assembly 34 and a striker structure 36. Vehicle body 32 defines a structure having a door aperture 38. Door assembly 34 is shown to be pivotably coupled to vehicle body 32 through a pair of hinges (not shown) which permit door assembly 34 to be positioned between a closed position, wherein door assembly 34 closes a door aperture 38 in vehicle body 32, and an open position, wherein door assembly clears door aperture 38. Door assembly 34 includes a conventional door structure 40 and a conventional latch mechanism 42. Door structure 40 includes an outer panel 44 and a rear member 46 having a latch aperture 48.

Latch mechanism 42 includes a housing 50, a striker chute 52 and a latch ratchet 54. Striker chute 52 is fixedly coupled to housing 50 and operable for locating latch mechanism 42 to latch aperture 48. Latch ratchet 54 includes a striker aperture 56 which conventionally includes a first portion 58 and a second portion 60, the function of which will be discussed in further detail, below. Latch ratchet 54 is rotatably coupled to housing 50 and operable between a unlatched condition wherein the striker aperture 56 is aligned between the striker chute 52 as shown in FIG. 3, and a latched condition wherein the striker aperture has been rotated relative to the striker chute 52. Latch mechanism 42 is aligned to latch aperture 48 and fixedly coupled to door structure 40 such that striker aperture 56 is aligned to latch aperture 48 and striker chute 52 when latch ratchet 54 is positioned in the unlatched condition.

Striker structure 36 is illustrated as having a striker member 62 and a mounting plate 64. Striker member 62 is generally U-shaped and fixedly coupled to mounting plate 64 such that the legs 66 of striker member 62 extend perpendicularly outwardly from mounting plate 64. Mounting plate 64 includes a pair of fastener apertures 68 which permit mounting plate to be coupled to vehicle body 32 through a pair of conventional fasteners 70. When installed and properly aligned, leg 66*a* of striker member 62 is adapted to engage the second portion 60 of striker aperture 56.

Body Locating Portion

Figure 5:
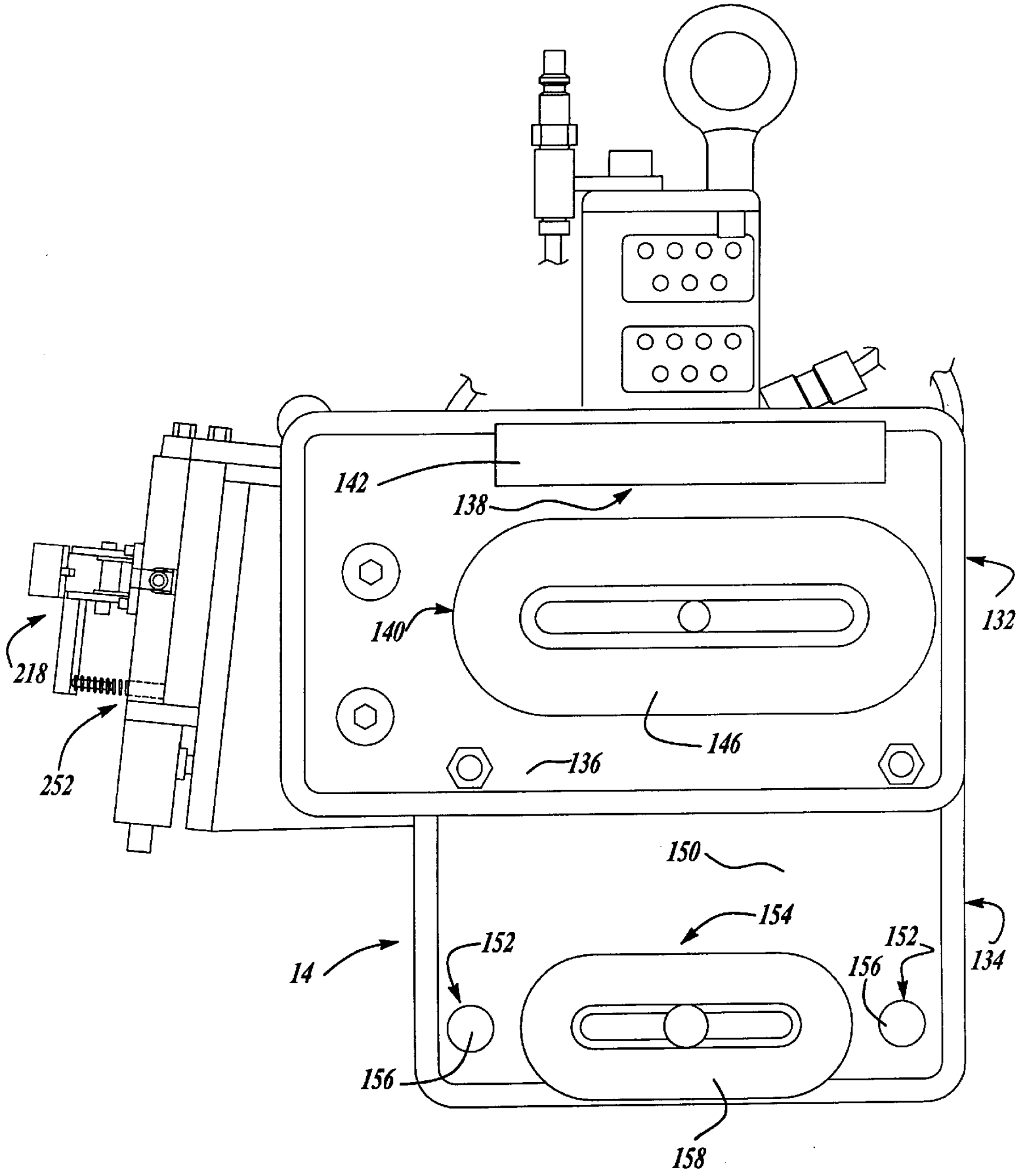
FIG. 5 is a front view of the tool of FIG. 1.
Figure 6:
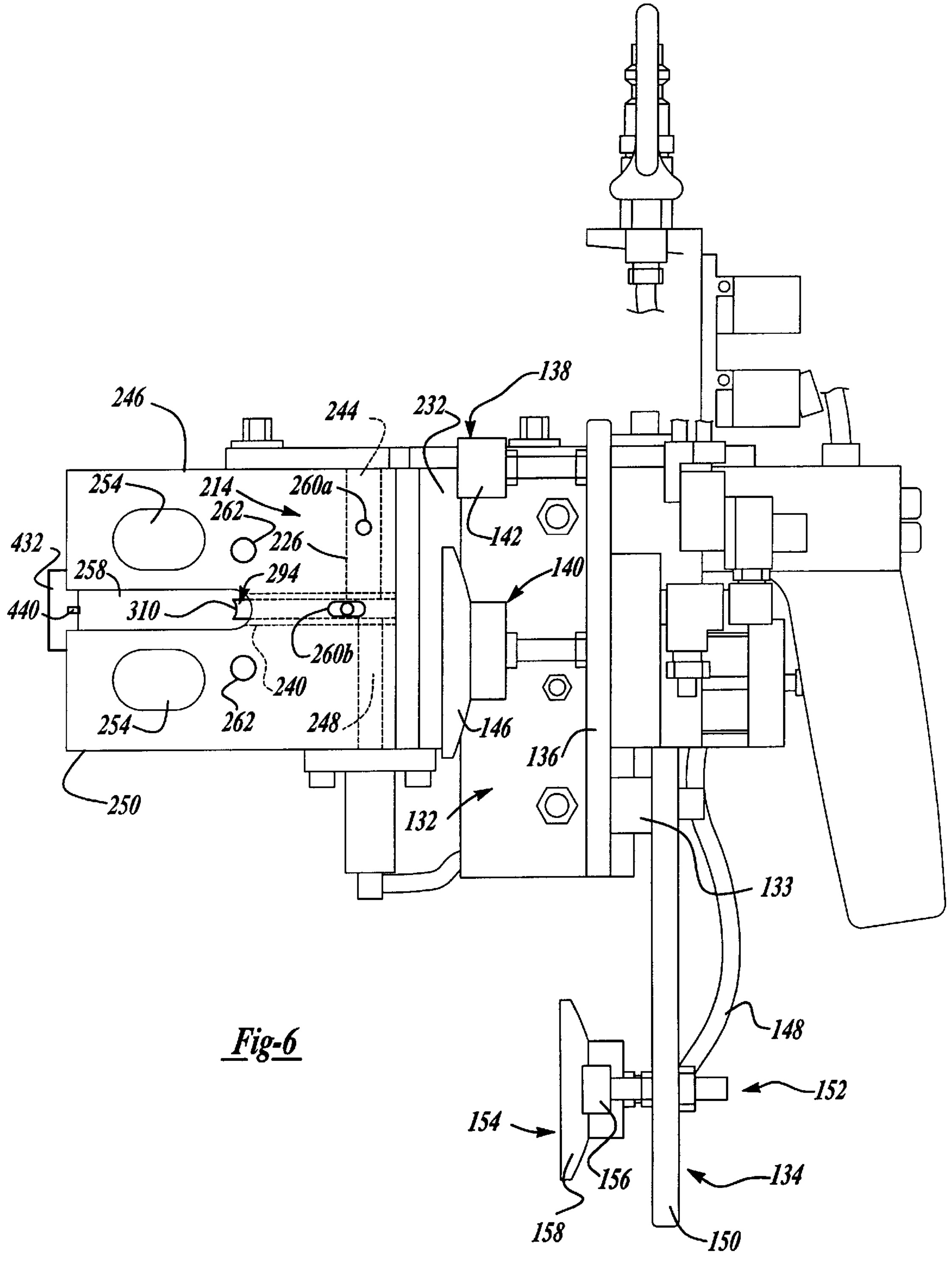
FIG. 6 is a left side view of the tool of FIG. 1.

Referring back to FIG. 1, and with additional reference to FIGS. 5 and 6, body locating portion 14 is operable for securing tool 10 to a vehicle body 32. In the particular embodiment illustrated, body locating portion 14 includes an upper locating portion 132, a spacer 133 and a lower locating portion 134. Upper locating portion 132 includes a plate member 136, an upper bumper structure 138 and an upper securing structure 140. Upper bumper structure 138 is fixedly coupled to plate member 136 and includes a resilient bumper member 142 which is adapted to prevent tool 10 from scratching or marring the finish of vehicle body 32 when tool 10 is being used.

Upper securing structure 140 includes a suction cup member 146 which is conventional in construction and also fixedly coupled to plate member 136. Suction cup member 146 is adapted to secure upper locating portion 132 to vehicle body 32 when upper securing structure 140 is placed proximate a predetermined portion of vehicle body 32 and vacuum pressure which exceeds a predetermined minimum pressure is applied to suction cup member 146. Suction cup member 146 is coupled to controls portion 26 through a vacuum hose 148.

Lower locating portion 134 includes a plate member 150, a pair of lower bumper structures 152 and a lower securing structure 154. Each of the lower bumper structures 152 are fixedly coupled to plate member 150 and include a resilient bumper member 156 which is adapted to prevent tool 10 from scratching or marring the finish of vehicle body 32 when tool 10 is being used.

Lower securing structure 154 includes a suction cup member 158 which is conventional in construction and also fixedly coupled to plate member 150. Suction cup member 158 is adapted to secure lower locating portion 134 to vehicle body 32 when lower securing structure 154 is placed proximate a predetermined portion of vehicle body 32 and vacuum pressure which exceeds a predetermined minimum pressure is applied to suction cup member 158. Suction cup member 158 is also coupled to controls portion 26 through vacuum hose 148.

Spacer 133 is fixedly coupled to plate members 136 and 150. Spacer 133 is operable for spacing plate member 136 apart from plate member 150 a predetermined distance to permit body locating portion 14 to conform to a desired portion of vehicle body 32.

Fixturing Portion

In the particular embodiment illustrated fixturing portion 16 includes a bracket structure 210, a bumper structure 212, a backing plate 214, a door location portion 216 and a latch locating portion 218. Bracket structure 210 couples fixturing portion 16 and seal load simulation portion 20 to body locating portion 14. Bracket structure 210 is generally L-shaped and formed from a suitable structural material such as aluminum. Bumper structure 212 is operable for spacing bracket structure 210 apart from rear member 46 a predetermined distance. Preferably, bumper structure 212 simulates a portion of vehicle body 32 when door assembly 34 is placed in the closed position. Bumper structure 212 is formed from a wear resistant plastic material, such as DELRIN®, which is adapted to prevent tool 10 from scratching or marring the finish of door structure 40 when tool 10 is being used.

Backing plate 214 is fixedly coupled to bracket structure 210 and serves as a foundation for the door and latch locating portions 216 and 218. Backing plate 214 is preferably unitarily formed from a wear resistant plastic material, such as DELRIN®, which is adapted to prevent tool 10 from scratching or marring the finish of door structure 40 when tool 10 is being used. Backing plate 214 is an elongated member having a first portion 224 adapted for mounting door location portion 216 and a second portion 226 which is offset laterally from the first portion 224 and adapted for mounting latch locating portion 218.

Figure 7:
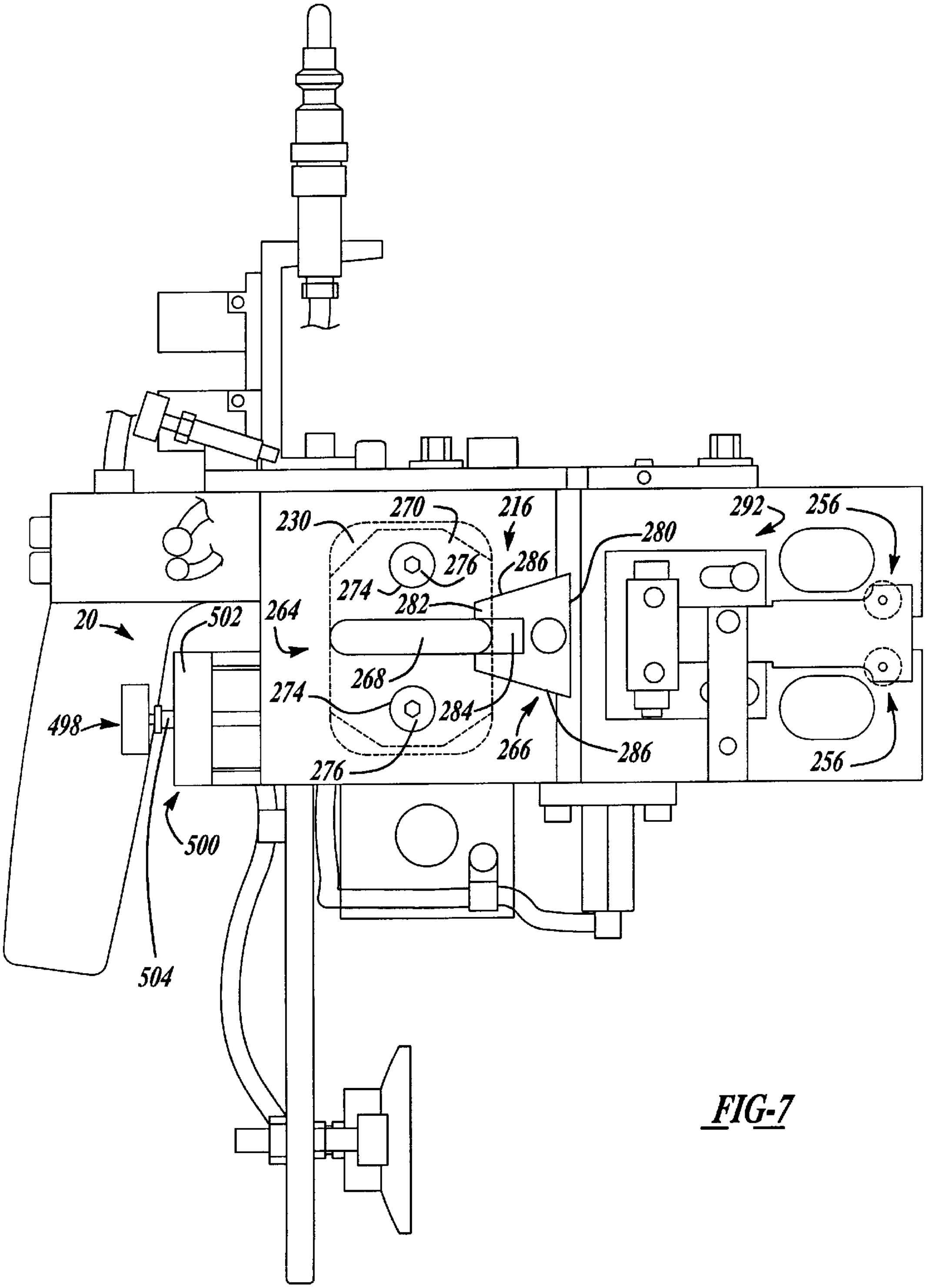
FIG. 7 is a right side view of the tool of FIG. 1.

With additional reference to FIG. 7, first portion 224 includes a first cavity 230 in the rear surface 232 of backing plate 214. Second portion 226 includes a second cavity 240 located in the outward end of backing plate 214, a third cavity 244 located in the top surface 246 of backing plate 214, a fourth cavity 248 located in the bottom surface 250 of backing plate 214, a spring aperture 252, a pair of fastener apertures 254, a pair of magnet apertures 256 and a slotted aperture 258. Slotted aperture 258 is adapted to receive the legs 66 of striker structure 36. Third and fourth cavities 244 and 248 intersect second cavity 240. Backing plate 214 also includes a plurality of pin apertures 260 and fastener apertures 262.

Door location portion 216 includes a striker simulator 264 and a striker wedge 266. Striker simulator 264 is identical to striker structure 36 and need not be discussed in detail. Briefly, striker simulator 264 includes a generally U-shaped striker member 268 and a mounting plate 270. The legs 272 are fixedly coupled to mounting plate 270. Mounting plate 270 includes a pair of fastener apertures 274. Striker simulator 264 is mounted in first cavity 230 and fasteners 276 are inserted through apertures in backing plate 214, striker simulator 264 and bracket structure 210. Nuts 278 are threadably engaged to fasteners 276 to secure both backing plate 214 and striker simulator 264 to bracket structure 210.

The cross-section of striker wedge 266 is generally shaped as a truncated triangle having a base 280 and a tip 282. A U-shaped striker slot 284 extends from tip 282 toward base 280 and is sized to receive leg 272*b* of striker simulator 264. Striker wedge 266 is fixedly coupled to backing plate 214 such that leg 272*b* of striker simulator 264 is partially disposed within striker slot 284. The sides 286 of striker wedge 266 are adapted to engage striker chute 52 when striker simulator 264 is engaged to latch ratchet 54. As such, striker wedge 266 is operable for limiting the rotation of tool 10 about latch mechanism 42 when striker simulator 264 is engaged to latch ratchet 54.

Latch locating portion 218 includes a latch positioning mechanism 290 and a latch clamp 292. In the particular embodiment illustrated, latch positioning mechanism 290 includes a positioning member 294, a link member 296, a pivot pin 330, first and second coupling pins 332 and 356, respectively, a link positioning structure 304, a pair of positioning guides 306 and a stop mechanism 308. Positioning member 294 is a cylindrical rod having a magnetic tip 310 at a first end and a link connecting portion 312 at a distal end. Magnetic tip 310 is machined to match the profile of leg 272*a*. Link connecting portion 312 includes a link slot 314 extending along an axis parallel top surface 246 and a connector aperture 316 extending along an axis perpendicular to link slot 314. Positioning member 294 is disposed at least partially within second cavity 240 and operable for adjusting the striker structure 36 in a cross-car direction as will be discussed in detail below.

Link member 296 is disposed within third cavity 244 and includes a pivot aperture 324 and first and second slotted pin apertures 326 and 328, respectively. Pivot pin 330 extends through pivot aperture 324 and a pin aperture 260*a* in backing plate 214 and pivotably couples link member 296 to backing plate 214. A first end of link member 296 is disposed in link slot 314 at the distal end of positioning member 294. First coupling pin 332 extends through a pin slot 260*b* in backing plate 214, the connector aperture 316 in positioning member 294 and first slotted pin aperture 326 to couple link member 296 and positioning member 294. Rotation of link member 296 about pivot pin 330 is therefore operable for causing positioning member 294 to extend from or retract into second cavity 240. The end distal the first end of link member 296 extends outwardly from third cavity 244 above top surface 246.

Figure 8:
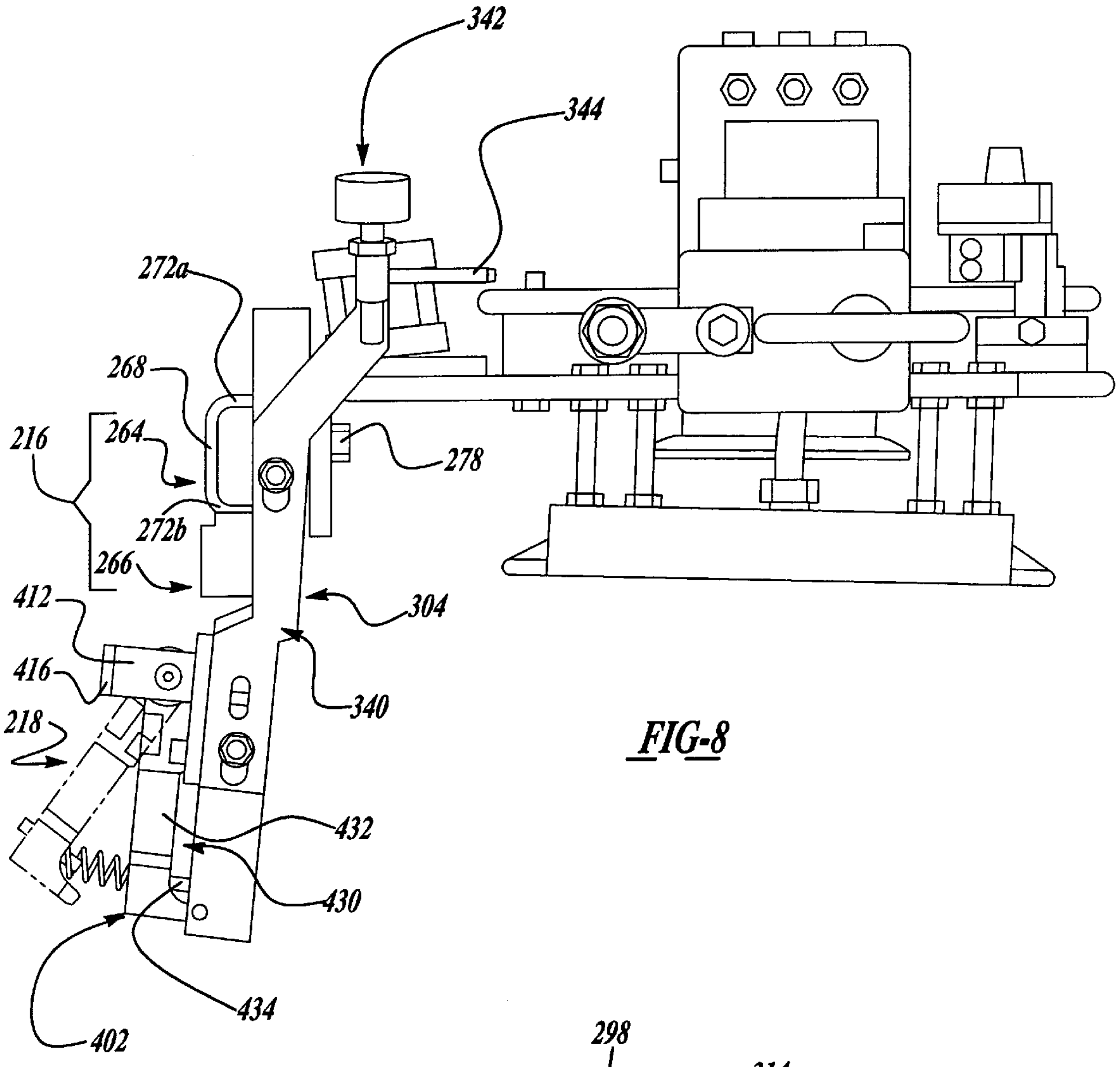
FIG. 8 is a top view of the tool of FIG. 1.
Figure 10B:
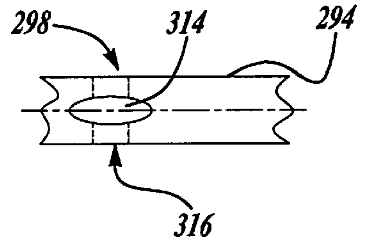
FIG. 10B is a top view of a portion the fixturing portion shown in FIG. 10A.
Figure 10C:
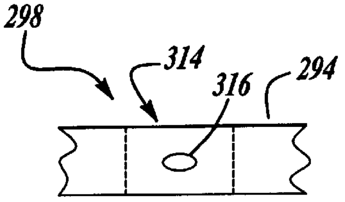
FIG. 10C is a side view of the fixturing portion shown in FIG. 10B.
Figure 9:
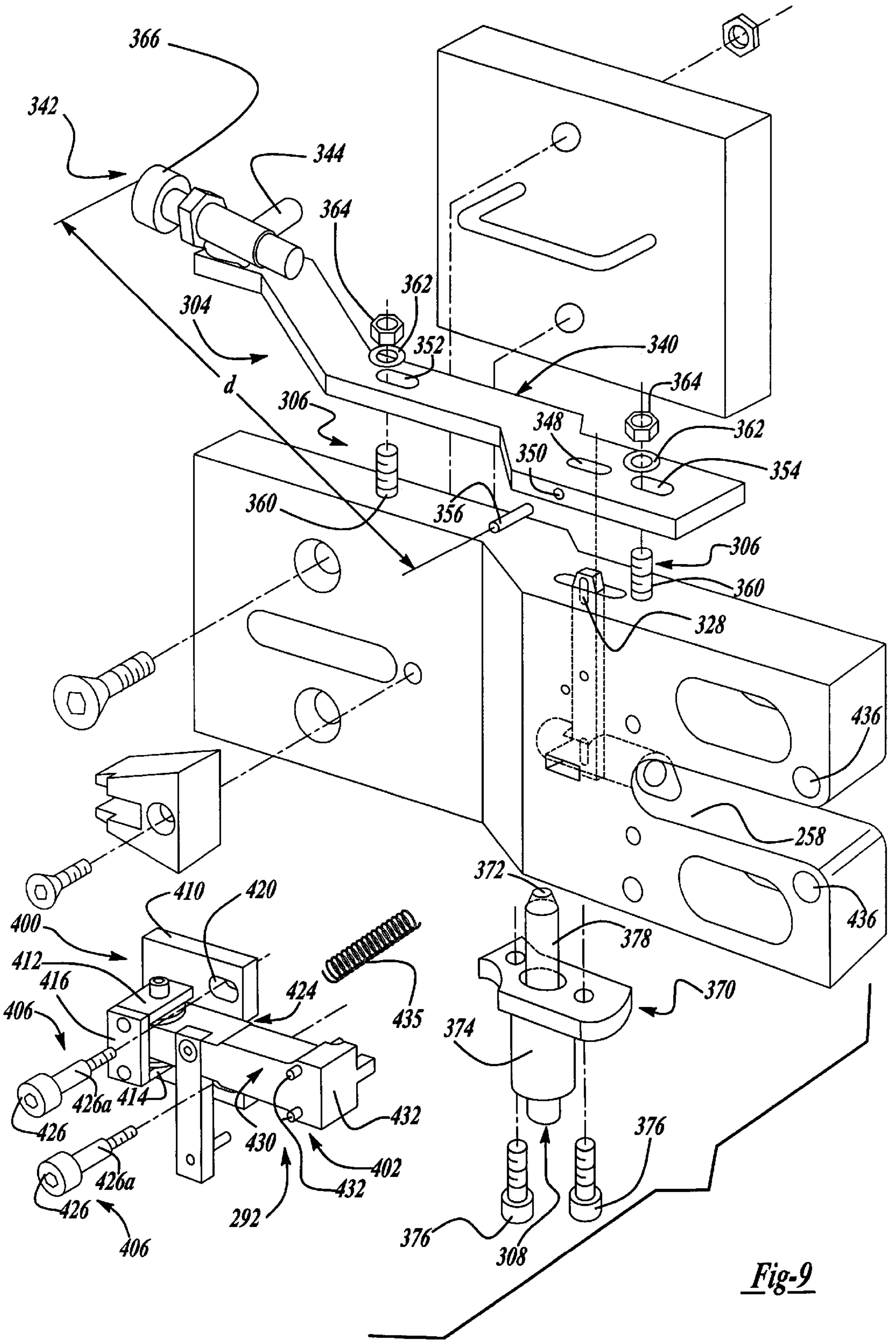
FIG. 9 is an exploded perspective view of the fixturing portion of the tool of FIG. 1.

In FIGS. 8 and 9, link positioning structure 304 includes an abutting member 340, a bumper structure 342 and a handle member 344. Abutting member 340 is generally flat and adapted to slide along the top surface 246 of backing plate 214. Abutting member 340 includes a link positioning slot 348, a link coupling aperture 350 and first and second guide slots 352 and 354, respectively. Abutting member 340 is placed over third cavity 244 such that the distal end of link member 296 extends into link positioning slot 348. Second coupling pin 356 is placed through link coupling aperture 350 and the second slotted pin aperture 328 to couple link member 296 to abutting member 340.

Each of the positioning guides 306 includes a threaded stud 360, a washer 362 and a locking nut 364. Threaded studs 360 are placed through each of the link positioning slots 352 and 354 and threadably engaged to backing plate 214. Washer 362 and locking nut 364 are employed to confine the vertical movement of abutting member 340 while permitting abutting member 340 to move freely in a cross-car direction. Movement of abutting member 340 in the cross-car direction therefore causes link member 296 to pivot about pivot pin 330.

Bumper structure 342 includes a resilient bumper member 366 which is adapted to contact the rear surface 44*a* of outer panel 44 (shown in FIG. 2). Bumper structure 342 is adjustably coupled to link member 296 which permits the distance between the end of bumper member 366 to the centerline of the link coupling aperture 350 (indicated by dimension "d"). Handle member 344 is fixedly coupled to abutting member 340 and is adapted to permit an operator employing tool 10 to slide abutting member 340 along top surface 246 so that bumper member 366 contacts rear surface 44*a*.

Figure 10A:
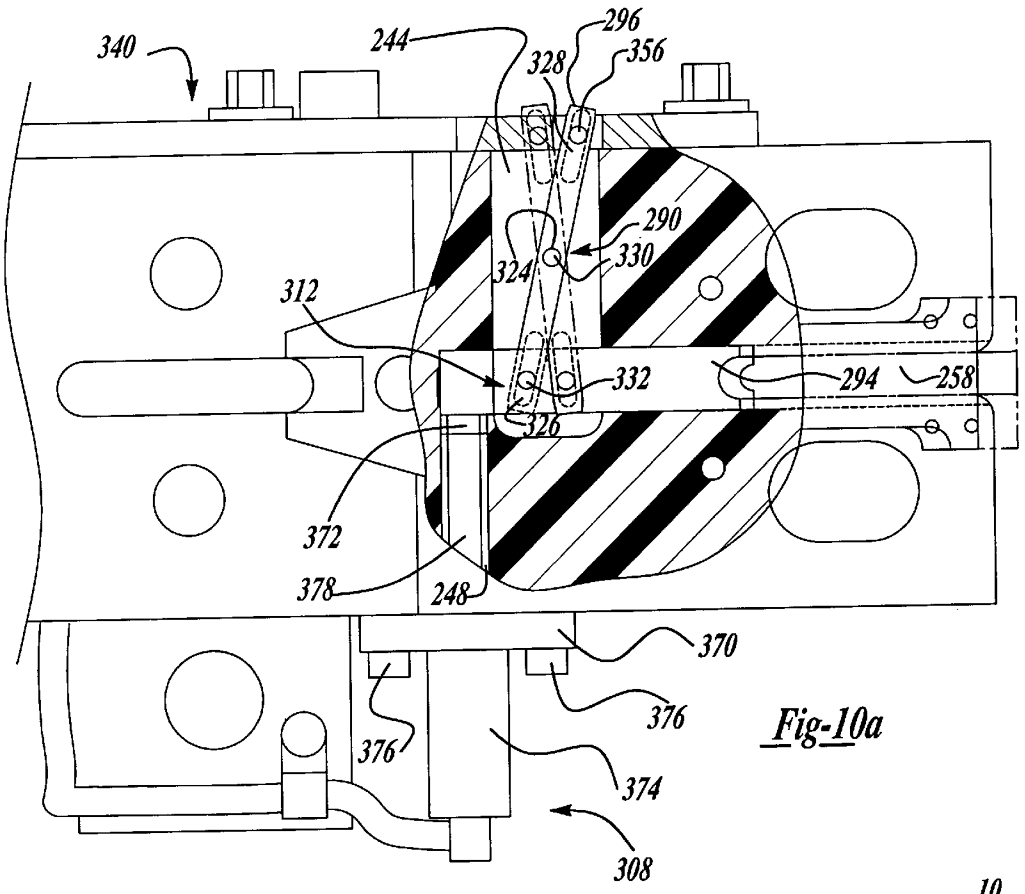
FIG. 10A is a cut-away view illustrating a portion of the fixturing portion of the tool of FIG. 1.

In FIGS. 9 and 10A, stop mechanism 308 is operable for restraining the movement of positioning member 294 in first cavity 230. Stop mechanism 308 includes a cylinder assembly 370, a resilient stop member 372, a protective sleeve 374 and a pair of fasteners 376. Cylinder assembly 370 is a conventional double-acting pneumatic cylinder, such as a 01–05 cylinder manufactured by Bimba Manufacturing Company, having a cylinder housing (not specifically shown), a piston (not specifically shown) and a rod 378. Cylinder assembly 370 is coupled to controls portion 26 and maintained in a condition such that rod 378 is normally retracted. Resilient stop member 372 is coupled to the distal end of rod 378.

Protective sleeve 374 includes a generally hollow body portion and a flange portion (not specifically shown). Cylinder assembly 370 is disposed within protective sleeve 374. Fasteners 276 extend through the flange portion of protective sleeve 374 into bottom surface 250 to fixedly but removably couple cylinder assembly 370 and protective sleeve 374 to backing plate 214. In coupling cylinder assembly 370 to backing plate 214, cylinder assembly 370 is positioned such that rod 278 extends into fourth cavity 248. Protective sleeve 374 prevents the housing of cylinder assembly 370 from moving in a direction away from backing plate 214. Protective sleeve 374 is fabricated from a wear resistant plastic material, such as DELRIN®, which is adapted to prevent tool 10 from scratching or marring the finish of door structure 40 when tool 10 is being used.

Latch clamp 292 includes a first clamp structure 400, a second clamp structure 402 and a pair of guides 406. First clamp structure 400 includes a base portion 410, first and second fork members 412 and 414 and a stop member 372. Base portion 410 includes a pair of slotted guide apertures 420, a pin aperture 422 and a slotted aperture 424. First and second fork members 412 and 414 each extend generally perpendicularly outward from base portion 410. Stop member 372 is a generally flat member which is fixedly but removably coupled to the distal ends of first and second fork members 412 and 414.

Guides 406 are illustrated as being conventional shoulder screws 426. Shoulder screws 426 are inserted through each of the slotted guide apertures 420 and threadably engaged to backing plate 214. First coupling pin 332 extends through backing plate 214 and into pin aperture 422 to couple positioning member 294 and first clamp structure 400 together. Movement of link positioning structure 304 is therefore operable for moving positioning member 294 as well as first clamp structure 400. The shoulder portions 426*a* of shoulder screws 426 are operable for guiding first clamp structure 400 along an axis parallel to positioning member 294.

With additional reference to FIG. 8, second clamp structure 402 includes a clamp arm structure 430 with a clamp arm 432 and a pair of pin inserts 434. Clamp arm structure 430 is pivotably coupled to first and second fork members 412 and 414 and positionable between a closed position and an open position. Clamp arm structure 430 is biased toward the open position by a compression spring 435. Stop member 372 inhibits clamp arm structure 430 from pivoting away from backing plate 214 beyond a predetermined point. Each of the pin inserts 434 contacts a magnet 436 disposed within magnet apertures 256 when clamp arm structure 430 is placed in the closed position. Magnets 436 are operable for maintaining clamp arm structure 430 in the closed position.

With renewed reference to FIG. 6, the tip 440 of clamp arm structure 430 is sized to extend into slotted striker aperture 56 when clamp arm structure 430 is positioned in the closed position. Tip 440 is configured to push striker structure 36 toward the magnetic tip 310 of positioning member 294 when clamp arm structure 430 is closed and a striker structure 36 is disposed within slotted striker aperture 56.

Seal Load Simulation Portion

In FIGS. 1 and 7, seal load simulation portion 20 includes a bumper structure 498 and a pneumatic cylinder assembly 500, such as a F04-1 cylinder manufactured by Bimba Manufacturing Company, having a cylinder housing 502 and a rod 504. Cylinder assembly 500 is normally maintained in a retracted condition wherein rod 504 is retracted within cylinder housing 502. Cylinder housing 502 is coupled to bracket structure 210 and oriented such that bumper structure 498 contacts the rear surface 44*a* of outer panel 44 when rod 504 has been extended. Cylinder assembly 500 is operable for exterting a force on rear surface 44*a* which approximately simulates the load which would be generated through the compression of a resilient seal (not specifically shown) surrounding door aperture 38 when door assembly 34 is positioned in the closed position.

Controls Portion

Figure 16:
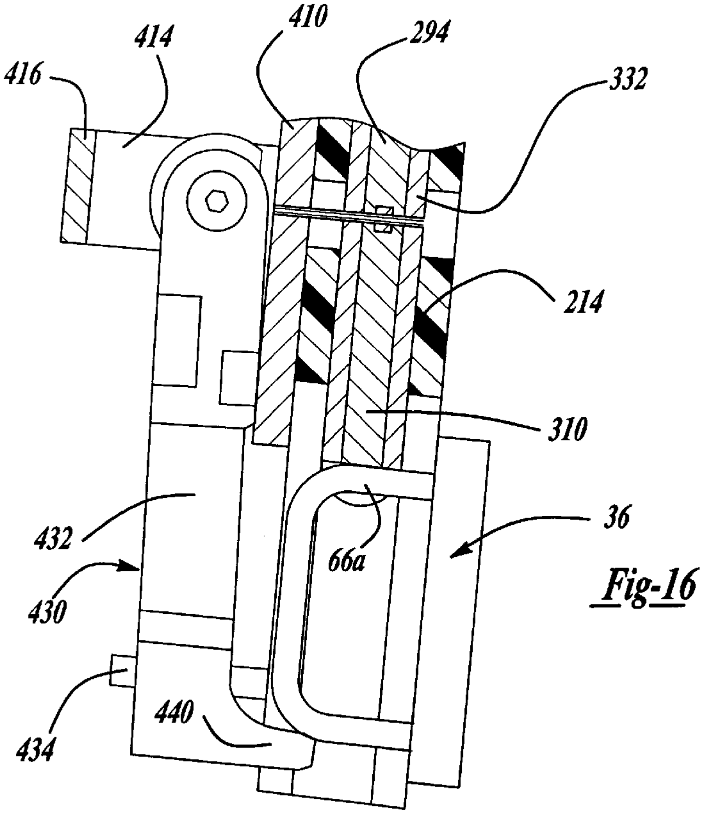
FIG. 16 is a partial section view of the tool of FIG. 1 confining a striker structure to a desired location.

Controls portion 26 is schematically illustrated in FIG. 16 as including an inlet port 600, a handle assembly 602, a vacuum pump 604, first and second directional valves 606 and 608, respectively, a vacuum switch 610 and a plurality of fluid conduits 612. With additional reference to FIG. 1, handle assembly 602 includes a handle member 344 and a plurality of push-button actuated, spring-return directional valves 622*a*, 622*b* and 622*c*. Each of the first and second directional valves 606 and 608 are 2 position, 4-way, detented, pilot-operated valves.

Tool Operation

An air line is coupled to tool 10 and provides compressed air to inlet port 600. Conduits 612*a*, 612*b*, 612*c* and 612*d* direct the compressed air is directed to vacuum switch 610, first and second directional valves 606 and 608 and push-button valves 622*b* and 622*c*. The valve body of first directional valve 606 is positioned in a first valve position which provides a flow path to the return side of cylinder assembly 500, causing the rod of cylinder assembly 500 to remain in a retracted state. Similarly, the valve body of the second directional valve 608 is positioned in a first valve position which provides a flow path to the return side of cylinder 370, causing the rod of cylinder assembly 370 to remain in a retracted state.

Striker structure 36 is placed proximate vehicle body 32 and fasteners 70 are inserted through fastener apertures 68 and threadably engaged to vehicle body 32. Fasteners 70 are not tightened to produce a clamping force at this point and thereby only loosely couple striker structure 36 to vehicle body 32 to permit tool 10 to position striker structure 36 in a desired manner.

Figure 11:
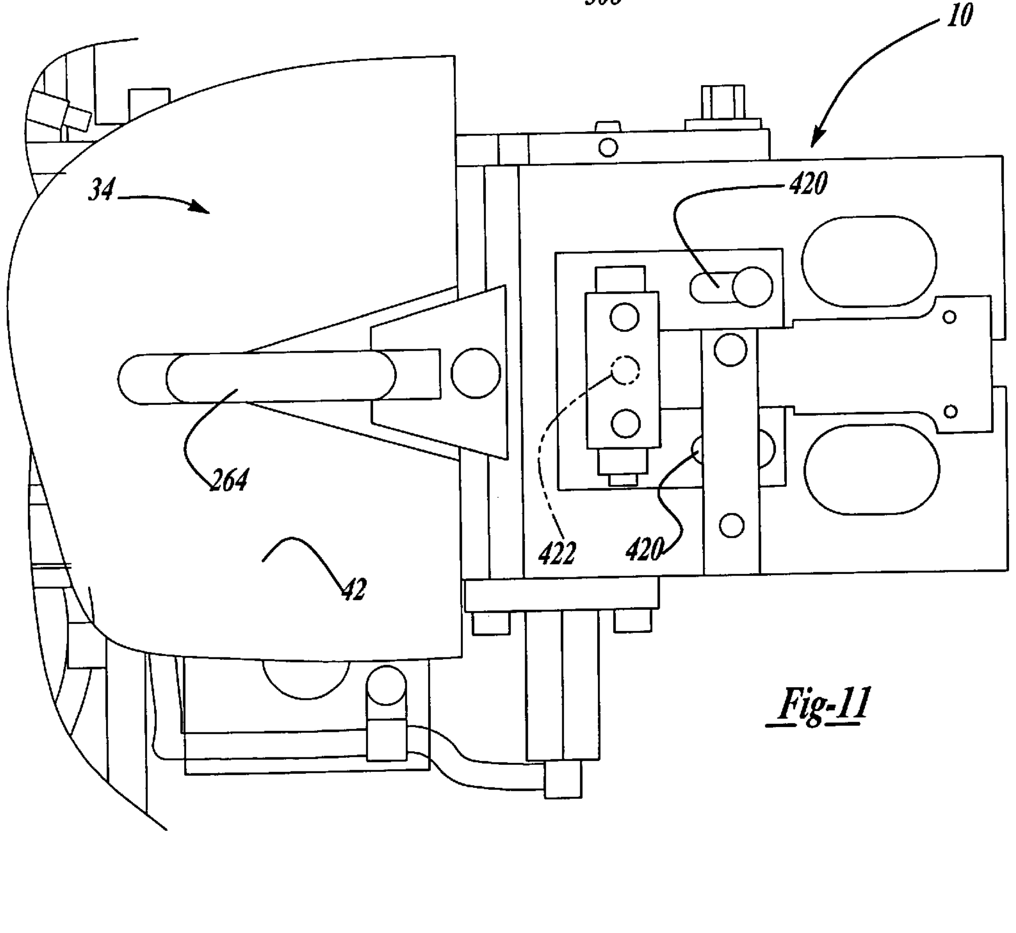
FIG. 11 is a side view of the tool of FIG. 1 in operative association with a latch mechanism.
Figure 12:
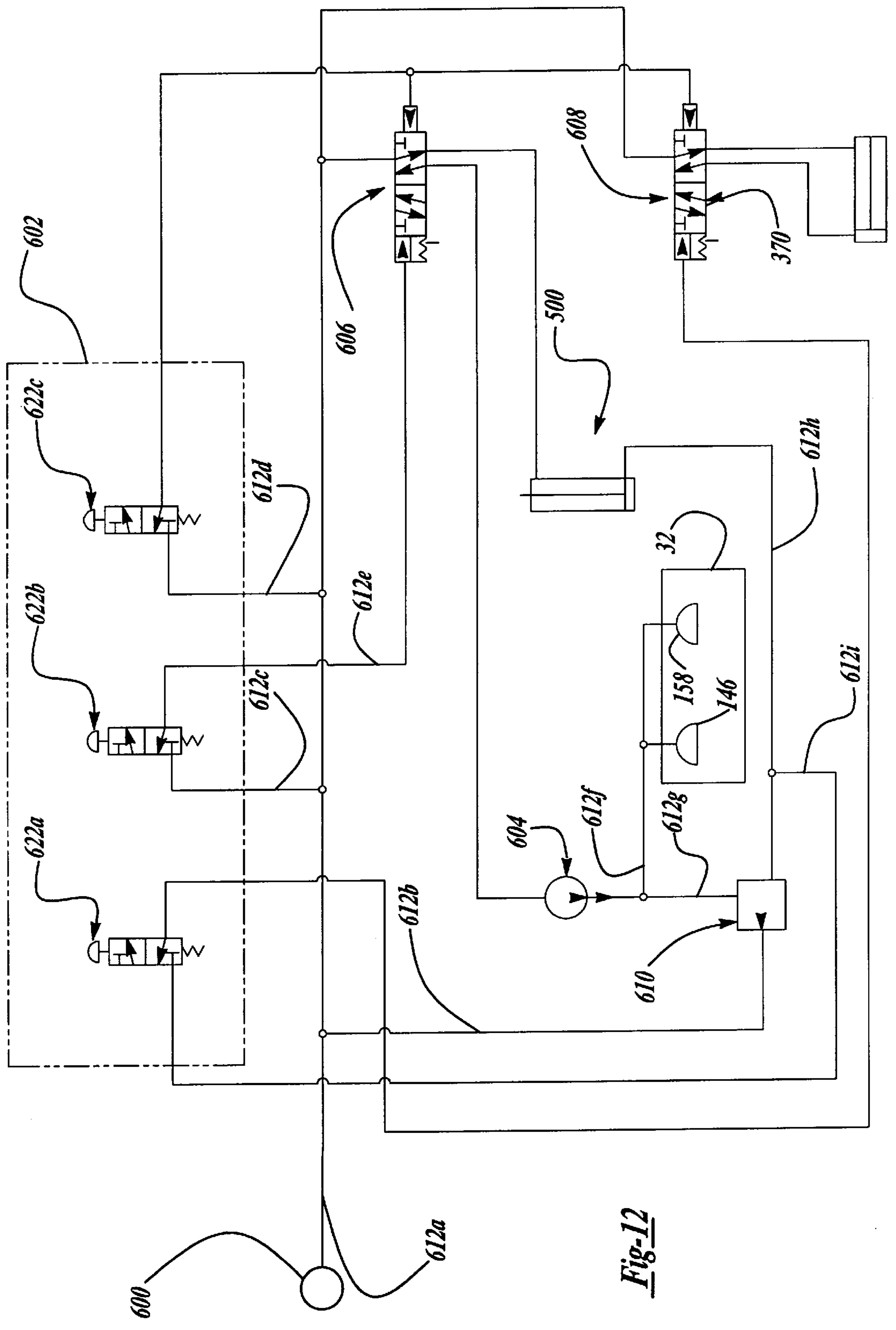
FIG. 12 is a schematic diagram illustrating the controls portion of the tool of FIG. 1.
Figure 13:
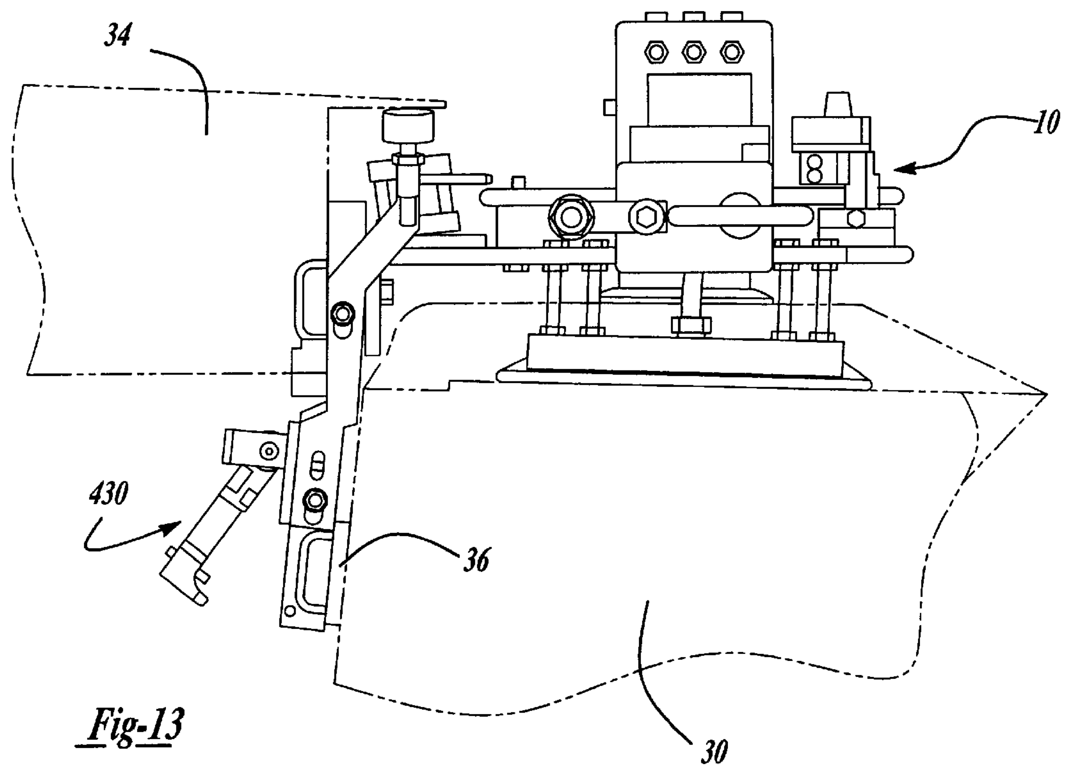
FIG. 13 is a top view of the tool of FIG. 1 in operative association with a vehicle door and vehicle body.

In FIG. 11, tool 10 is placed against door assembly 34 and striker simulator 264 is engaged to latch mechanism 42 (i.e., the leg 272*a* of striker simulator 264 is engaged into the first portion 60 of latch ratchet 54 and the sides 286 of striker wedge 266 engage striker chute 52). Door assembly 34 is pivoted toward the closed position until the legs 66 of the striker structure 36 are received into the slotted aperture 258 and the suction cup members 146 and 158 contact vehicle body 32 as shown in FIG. 13.

Push-button valve 622*b* is actuated and provides a flow path for the compressed air through conduit 612*e* to provide pilot pressure to first directional valve 606. In response to the pilot pressure, the valve body of first directional valve 606 shifts into a second valve position permitting compressed air to flow to actuate vacuum pump 604 and exhausting the return side of cylinder assembly 500 to the atmosphere.

Once actuated, vacuum pump 604 is operable for generating negative pressure and tends to draw air from conduits 612*f* and 612*g*. As suction cup members 146 and 158 are engaged to vehicle body 32, air is inhibited from entering into conduit 612*f* causing the accumulation of negative pressure in conduits 612*f* and 612*g*. After a predetermined amount of negative pressure has accumulated in conduit 612*g*, vacuum switch 610 opens, releasing compressed air to conduits 612*h* and 612*i* to supply compressed air to push-button valve 622*a* and to the extend side of cylinder assembly 500. The rod of cylinder assembly 500 extends in response thereto, causing bumper structure 498 to contact rear surface 44*a* and exert a simulated seal load. The simulated seal load is transmitted through tool 10 and door assembly 34 and simulates the load generated when door assembly 34 is placed in the closed position.

Figure 15:
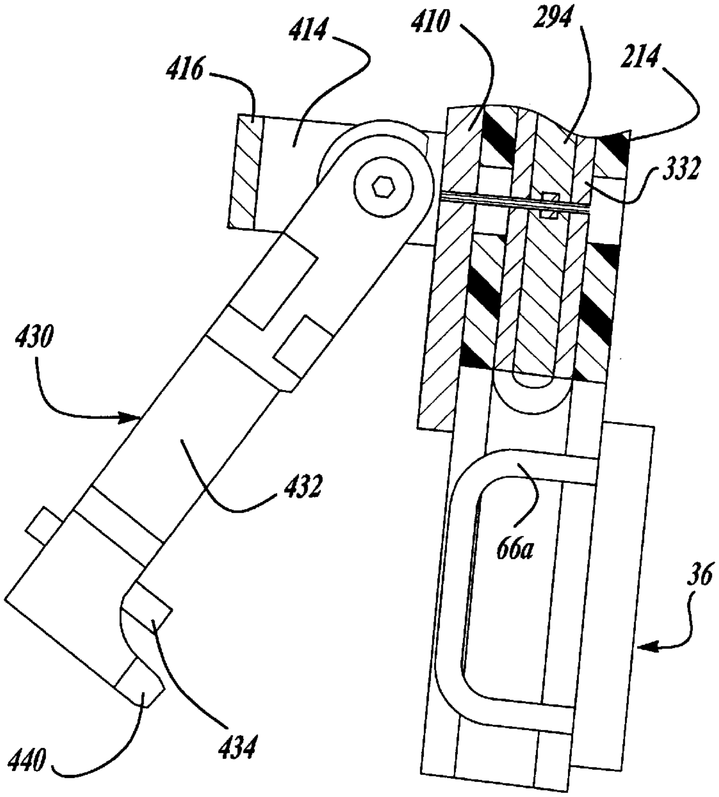
FIG. 15 is a partial section view of the tool of FIG. 1 as engaged to a striker structure.

As illustrated in FIG. 15, positioning member 294 is not in contact with the leg 66*a* of striker structure 36. Handle member 344 is moved in a direction away from vehicle 30 until bumper member 366 contacts rear surface 44*a*, thereby causing abutting member 340 to rotate link member 296 about pivot pin 330 and move positioning member 294 in slotted aperture 258 to a desired positioning member location (i.e., the outermost position of the leg 66*a* of the striker structure 36). As latch clamp 292 is coupled to positioning member 294, rotation of link member 296 about pivot pin 330 causes latch clamp 292 to move in the same direction and by an equivalent magnitude. Push-button valve 622*a* is next actuated to apply pilot pressure to second directional valve 608. In response to the pilot pressure, the valve body of second directional valve 608 shifts into a second valve position permitting compressed air to flow to the extend side of cylinder assembly 370 and venting the return side of cylinder assembly 370 to atmosphere. The rod of cylinder assembly 370 extends in response thereto and causes stop member 372 to fixedly but releasably lock positioning member 294 in the desired positioning member location.

Figure 14:
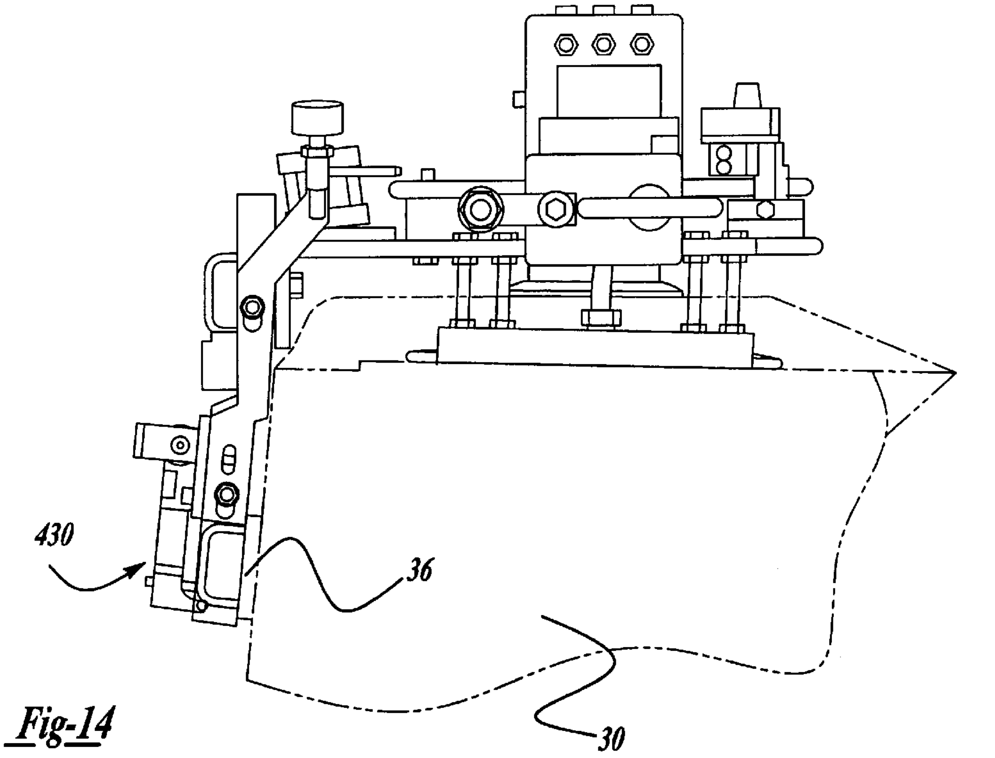
FIG. 14 is a top view of the tool of FIG. 1 in operative association with a vehicle body.

Latch mechanism 42 is next actuated to release striker simulator 264. Door assembly 34 is rotated toward the open position to permit access to striker structure 36. As illustrated in FIGS. 14 and 16, clamp arm structure 430 is next pivoted toward striker structure 36. Tip 440 is contoured to contact striker structure 36 and push it toward the magnetic tip 310 of positioning member 294. Magnets 436 bias clamp arm structure 430 toward the closed position, trapping striker structure 36 between magnetic tip 310 and tip 440. A conventional fastening tool is then utilized to tighten fasteners 70.

Push-button 622*c* may be actuated at any time and applies a pilot pressure to first and second directional valves 606 and 608 which causes their respective valve bodies to shift to their respective first valve positions. In response thereto, compressed air is provided to the return sides of cylinder assemblies 500 and 370, the extend sides of cylinder assemblies 500 and 370 is vented to atmosphere, and vacuum pump 604 is vented to atmosphere. Suction cup members 146 and 158 release from vehicle body 32. Clamp arm structure 430 is rotated away from striker structure 36 and handle member 344 is moved in a direction toward vehicle 30 to ready tool 10 for its next use.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

We claim:

1. A tool for coupling a striker structure to a first structure in operative alignment with a latch mechanism, the striker structure having a plate member and a leg member extending therefrom, the latch mechanism coupled to a second structure and having a latch ratchet for engaging the leg member, the first and second structures pivotably coupled to one another, the tool comprising:

a body locating portion for selectively coupling the tool to the first structure;

a first location portion fixedly coupled to the body locating portion, the first location portion having a wedge member and a post member, the post member adapted for engagement with the latch ratchet, the wedge member having a pair of tapered surfaces adapted for engaging one of the latch mechanism and the second structure to thereby limit an amount by which the tool may rotate about the post member; and a second location portion fixedly coupled to one of the body location portion and the first location portion, the second location portion having a plate member, a positioning member and a positioning structure, the plate member including a first cavity and a slot, the first cavity receiving the positioning member, the slot adapted to receive the leg member of the striker structure, the positioning structure coupled to the plate member and slidable thereon along an axis parallel the first cavity, the positioning structure adapted to contact a rear surface of the second structure, the positioning member disposed at least partially within the first cavity and coupled to the positioning structure such that axial movement of the positioning structure in a first axial direction causes the positioning member to move an equal amount in an axial direction opposite the first axial direction;

wherein contact between the positioning structure and the rear surface of the second structure causes the positioning member to move within the slot such that a tip of the positioning member defines a desired position of an outermost portion of the leg of the striker structure.

2. The tool of claim 1, further comprising a latch clamp having a clamp arm structure, the latch clamp coupled to plate member, the clamp arm structure pivotable about an axis perpendicular to the slot between an open condition and a closed condition, the clamp arm structure adapted to push the striker structure against the tip of the positioning member when positioned in the closed condition.

3. The tool of claim 2, further comprising spring means for biasing the clamp arm structure toward the open condition.

4. The tool of claim 2, wherein the latch clamp is fixedly coupled to the positioning member such that the latch clamp moves with the positioning member.

5. The tool of claim 1, further comprising a stop mechanism for selectively inhibiting the movement of the positioning member within the first cavity.

6. The tool of claim 1, wherein the positioning structure and the positioning member are interconnected by a link member, the link member at least partially disposed within a second cavity in the plate member, the link member pivotably coupled to the plate member and coupled at opposite ends to the positioning structure and the positioning member.

7. The tool of claim 1, further comprising a seal load simulation portion, the seal load simulation portion having a cylinder assembly coupled to the body locating portion, the cylinder assembly adapted to exert a force upon the a rear surface of the second structure which simulates a load exerted by a seal between the first and second structures when the first and second structures are placed in a closed position relative to one another.

8. The tool of claim 1, wherein the tip of the positioning member is magnetic.

9. The tool of claim 1, wherein the body location portion includes a pair of suction cup members.

10. A method for coupling a striker structure to a first structure in operative alignment with a latch mechanism, the striker structure having a plate member and a leg member extending therefrom, the latch mechanism coupled to a second structure and having a latch ratchet for engaging the leg member, the first and second structures pivotably coupled to one another, the method comprising the steps of:

providing a tool with a body locating portion, a first location portion and a second location portion, the first location portion having a wedge member and a post member, the wedge member having a pair of tapered surfaces, the second location portion having a plate member, a positioning member and a positioning structure, the plate member including a first cavity and a slot, the first cavity receiving the positioning member, the positioning structure coupled to the plate member and slidable thereon along an axis parallel the first cavity, the positioning member disposed at least partially within the first cavity and coupled to the positioning structure such that axial movement of the positioning structure in a first axial direction causes positioning member to move an equal amount in an axial direction opposite the first axial direction;

coupling the first location portion of the tool to the latch mechanism such that the latch ratchet engages the post member and the pair of tapered surfaces engages one of the latch mechanism and the second structure;

pivoting one of the first and second structures such that the body locating portion contacts the first structure and the striker structure is disposed within the slot;

coupling the body locating portion to the first structure;

determining a desired position of an outermost portion of the leg of the striker structure;

moving the second member away from the tool;

securing the striker structure to the first structure.

11. The method of claim 10, wherein the step of determining the desired position of the outermost portion of the leg of the striker structure includes the step of sliding the positioning structure against a rear surface of the second structure to cause the positioning member to move within the slot such that a tip of the positioning member defines a desired position of an outermost portion of the leg of the striker structure.

12. The method of claim 11, wherein the step of securing the striker structure to the first structure includes the steps of:

pushing the striker structure against the positioning member; and fastening the striker structure to the first structure.

13. The method of claim 12, wherein the step of pushing the striker structure against the positioning member is performed when a clamp arm structure is pivoted toward the striker structure.

14. The method of claim 11, wherein the step of determining the desired position of the outermost portion of the leg of the striker structure further includes the step of exerting a force on the first structure to simulate a load generated by a seal between the first and second structures when the first and second structures are positioned in a closed condition relative to one another.

15. A tool for coupling a striker structure to a first structure in operative alignment with a latch mechanism, the striker structure having a plate member and a leg member extending therefrom, the latch mechanism coupled to a second structure and having a latch ratchet for engaging the leg member, the first and second structures pivotably coupled to one another, the tool comprising:

a body locating portion for selectively coupling the tool to the first structure;

a first location portion fixedly coupled to the body locating portion, the first location portion having a wedge member and a post member, the post member adapted for engagement with the latch ratchet, the wedge member having a pair of tapered surfaces adapted for engaging one of the latch mechanism and the second structure to thereby limit an amount by which the tool may rotate about the post member; and a second location portion fixedly coupled to one of the body location portion and the first location portion, the second location portion having a plate member, a positioning member, a positioning structure and a link member, the plate member including a first cavity, a second cavity and a slot, the first cavity receiving the positioning member, the second cavity being perpendicular to the first cavity and receiving the link member, the slot adapted to receive the leg member of the striker structure, the positioning structure coupled to the plate member and slidable thereon along an axis parallel the first cavity, the positioning structure adapted to contact a rear surface of the second structure, the positioning member disposed at least partially within the first cavity, the link member at least partially disposed within a second cavity in the plate member and interconnecting the positioning structure and the positioning member, the link member pivotably coupled to the plate member and coupled at opposite ends to the positioning structure and the positioning member, the link member coupled to the positioning member and the positioning structure such that axial movement of the positioning structure in a first axial direction causes positioning member to move an equal amount in an axial direction opposite the first axial direction;

wherein contact between the positioning structure and the rear surface of the second structure causes the positioning member to move within the slot such that a tip of the positioning member defines a desired position of an outermost portion of the leg of the striker structure.

16. The tool of claim 15, further comprising a latch clamp having a clamp arm structure, the latch clamp coupled to plate member, the clamp arm structure pivotable about an axis perpendicular to the slot between an open condition and a closed condition, the clamp arm structure adapted to push the striker structure against the tip of the positioning member when positioned in the closed condition.

17. The tool of claim 16, wherein the latch clamp is fixedly coupled to the positioning member such that the latch clamp moves with the positioning member.

18. The tool of claim 15, further comprising a stop mechanism for selectively inhibiting the movement of the positioning member within the first cavity.

19. The tool of claim 15, wherein the tip of the positioning member is magnetic.

20. The tool of claim 15, further comprising a seal load simulation portion, the seal load simulation portion having a cylinder assembly coupled to the body locating portion, the cylinder assembly adapted to exert a force upon the a rear surface of the second structure which simulates a load exerted by a seal between the first and second structures when the first and second structures are placed in a closed position relative to one another.

* * * * *